Nov. 12, 1935.  F. S. WATTELLS  2,020,593
FUEL INDICATOR
Filed July 14, 1934
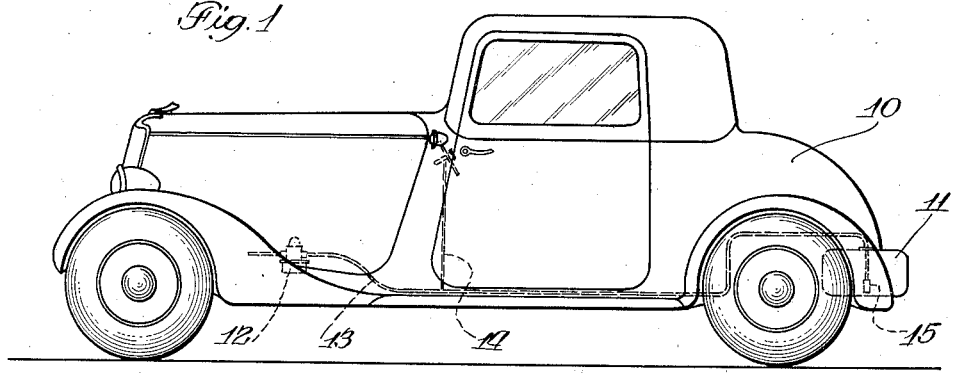
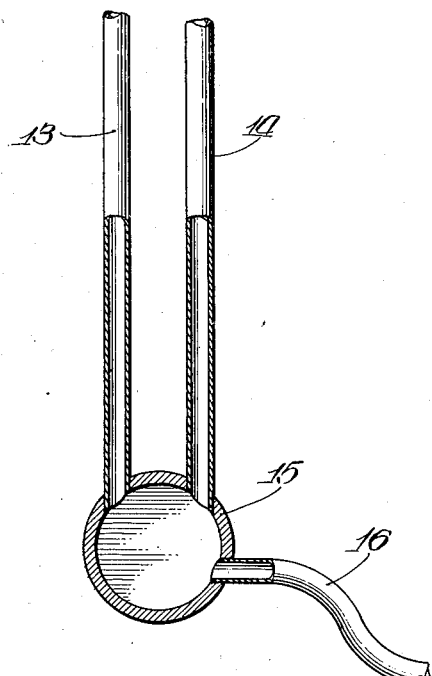
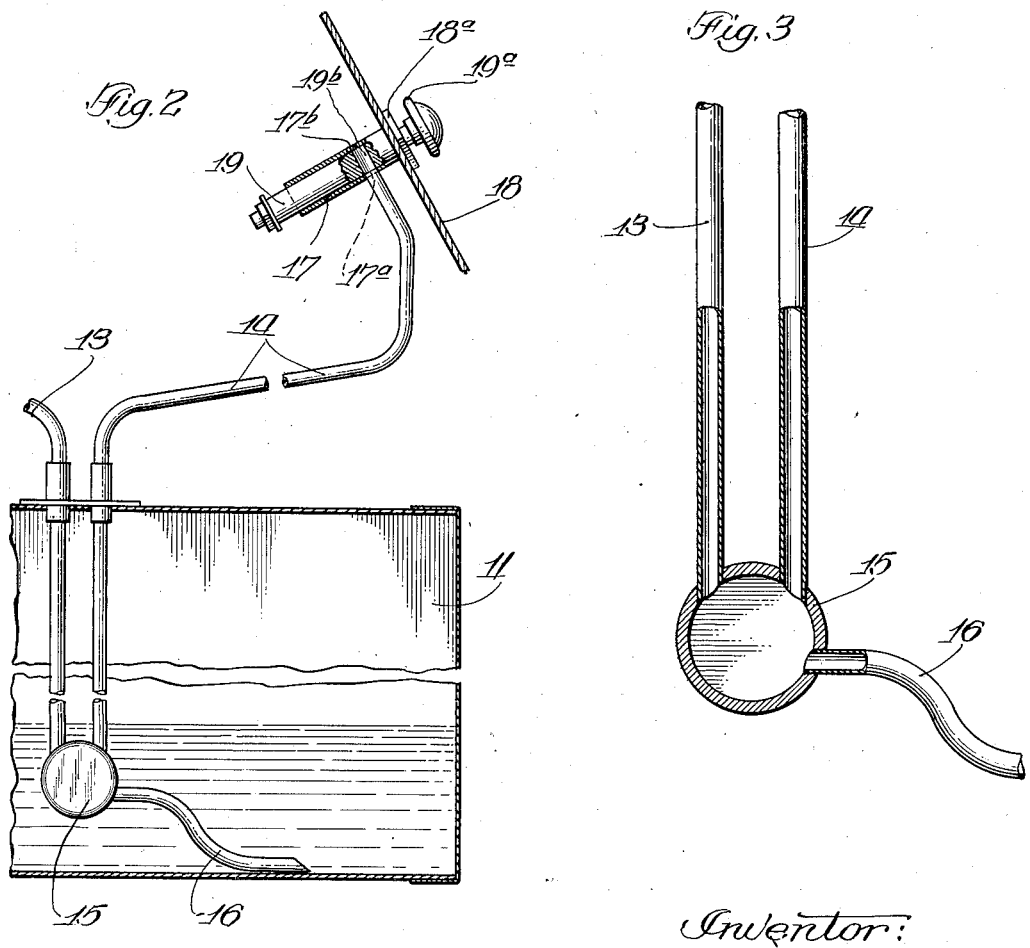
Inventor:
Frank S. Wattells.
By: Stevens & Batcheler
Atty's.

Patented Nov. 12, 1935

2,020,593

UNITED STATES PATENT OFFICE 2,020,593

FUEL INDICATOR

Frank S. Wattells, Chicago, Ill.

Application July 14, 1934, Serial No. 735,261

5 Claims. (Cl. 116—118)

My invention relates to fuel indicators more particularly as applied to motor cars, and the present embodiment is an improvement over the structure covered in my pending patent application, Serial Number 691,859, filed October 2, 1933.

One object of the improvement is to materially simplify the mechanism incident to the indicator.

Another object of the improvement is to provide an alternative structure in the zone where the vital change in operation occurs, whereby to accelerate such change.

With the above objects in view, reference is had to the accompanying drawing, in which Fig. 1 is an elevation of a typical motor car showing the application of the improved indicator by means of dotted lines;

Fig. 2 is an enlarged group assembly of the units mainly involved in the device; and Fig. 3 is a section of the main unit.

As stated in the previous case, it is customary for many motor cars to have a fuel gauge on the dash. Frequently such gauge is inefficient or misleading as to the actual amount of fuel in the tank, so that the car may run out of fuel when least expected or when it is far to the next filling station. To avoid this kind of an occurrence, many drivers are obliked to make frequent inspections or tests of the fuel level in the tank, or to carry spare fuel containers. In order to avoid the above risks or precautions, I have designed the improved fuel indicator to give a distinct warning to the driver in plenty time to reach a fuel station, and so construct the device that it can never fail.

In accordance with the foregoing objects, specific reference to the drawing indicates the motor car at 10, its main fuel tank at 11, its fuel suction pump at 12, and the fuel line from the main tank to the latter at 13.

In carrying out the improvement, I provide a companion air line 14 of tubing trained for a considerable distance immediately along the fuel line 13. As seen in Fig. 2, the two lines 13 and 14 pass downwardly into the tank 11 and make communication with the top portion of a chamber 15 located in the lower portion of the fuel tank 12. As seen in Fig. 3, the chamber 15 is a hollow body of firm construction, and has a lateral outlet near the bottom from which a short piece of tubing 16 extends to the bottom of the fuel tank 12.

The tubing line 14 only extends in forward direction to a point below the dash, where it rises as indicated in Fig. 1, to enter the wall of a tube 17 extending forward from the dash 18 and being suitably secured to the latter by a frontal nut 18a or other means. The tube 17 has a perforation 17a to receive the tube 14, and another perforation 17b diametrically opposite the first one. Within the tube 17 is slidable a plunger 19, the latter having a hand knob 19a on the front of the dash and being perforated crosswise at 19b. The parts just described appear in their normal positions in Fig. 2, the perforation 19b registering with the perforations 17a and 17b. Thus, a direct connection for the entry of atmospheric air into the tube 14 is had. However, should the plunger knob 19a be drawn out some distance, this connection will be cut off.

The novel indicator is not intended to function as long as a sufficient amount of fuel is had in the tank. The position of the chamber 15 is so calculated that the fuel below its connection with the tube 16 is considered as a reserve and to be drawn upon when the fuel has fallen to the level of such connection. With the level of fuel as indicated in Fig. 2, it will be apparent that the bottom openings of the lines 13 and 14 will be bridged by fuel, since a liquid finds its own level. However, should the demand of fuel in line 13 deplete the supply to the point where the openings of the lines into the chamber 15 are out of contact with the fuel, then the suction line 13 will begin to draw atmospheric air from the air line 14 by reason of its open condition in the region of the dash, as previously described. This action will cause the fuel charge to the motor to become lean, and the motor will therefore run irregularly and eventually stop, indicating to the driver that something is wrong with the fuel supply. On drawing the dash knob 19a outward, the atmospheric air supply to the line 14 will be cut off, and the motor will begin to draw fuel from the reserve line 16 and resume regular operation, proving that the motor disability was due to shortage of fuel. At the same time, the projected position of the dash knob 19a will be an indication to the driver that the motor is running on reserve fuel and a danger signal to stop at the nearest station and re-fuel. After this has been done, the knob 19a is pushed back to its original position, restoring the open entrance to the line 14.

The dash control treated in the present application is a simplification of the one previously described, but it is understood that any type of control may be employed as long as it serves to open and close the entrance to the line 14 and act as an indicator when the reserve feature of the device is in use.

Theoretically, the fall of the tank fuel below the bottom openings of the lines 13 and 14 should at once establish an air by-pass or communication between them. However, I have found by extensive experiment that this does not occur, as the flow of the fuel into the line 13 by suction is so sustained that it prevails despite the lowering of the general level in the fuel tank, so that the indicating function does not occur as one might properly expect, but is markedly delayed. For this reason, the improved indicator utilizes the chamber 15 to obtain a vertical differential between the entrance to the lines 13 and 14 and the reserve line 16. Thus, the continued fall of fuel in the chamber 15 gradually diminishes its connective tenacity, so to speak, between the reserve line 16 and the suction line 13, so that it soon breaks down, permitting the air communication from the line 14. The action is also assisted by the fact that an increasing air pressure accumulates in the chamber 15 as the fuel falls therein, tending to break up its continuity.

It is therefore seen that, by means of the chamber 15, I can calculate the height of the reserve tube 16 to permit a sufficient amount of reserve fuel to remain in the tank despite the delay in the responsive function of the indicator. Therefore, as far as the driver is concerned, the action is quite as automatic as in the previous case, but more positive, since the action must occur within the vertical space between the line outlets and the reserve inlet, whereas in my previous case the level at which the function occurred proved by actual experiment speculative.

In conclusion, it may be said that the improved indicator is, despite the addition of the single part 15, extremely simple, yet more reliable. Also, the improvement does not require any change or alteration in the motor car equipment beyond that contemplated in my previous case.

I claim:—

1. In combination, an internal combustion engine, a fuel tank therefor, a permanently open suction pipe line between said tank and engine and having a portion extending through the tank downwardly to its bottom, an air supply pipe leading into said tank and communicating therein with the suction pipe line at a point above and relatively close to the tank bottom, and a valve controlling said air supply pipe.

2. In combination, an internal combustion engine, a fuel tank therefor, a chambered vessel in said tank above its bottom, a suction pipe leading from the vessel to the engine, a suction pipe leading from the bottom of the tank to the vessel, an air supply pipe communicating with said vessel above the inlet of said pipe from the tank bottom, and a valve controlling said air supply pipe.

3. In combination, an internal combustion engine, a fuel tank therefor, a chambered vessel in said tank above and adjacent its bottom, a pipe leading from said vessel to the bottom of the tank, a suction pipe leading from the vessel to the engine, a valve controlled air supply pipe leading into the tank in communication with the vessel, and both said suction pipe and air supply pipe opening to the vessel above the inlet of the pipe to the tank bottom.

4. In an automobile having a dash board, an engine and a fuel tank therefor; a permanently open suction pipe line between said tank and engine and having a portion extending through the tank downwardly to its bottom, a valve casing carried on the dash board, an air supply pipe leading from said valve casing into the tank and communicating therein with the suction line at a point above and relatively close to the tank bottom, and a valve plug movable in said casing through the dash board to control admission of air to said air supply pipe.

5. In an automobile having a dash board, an engine and a fuel tank therefor; a permanently open suction pipe line between said tank and engine and having a portion extending through the tank downwardly to its bottom, an air supply pipe having one end positioned adjacent said dash board and leading thence into the tank and communicating therein with the suction line at a point above and relatively close to the tank bottom, and said first named end of said air supply pipe being adapted to be closed by the operator of the automobile to control admission of air to said air supply pipe.

FRANK S. WATTELLS.